UNITED STATES PATENT OFFICE.

GEORG LIST, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

BROWN SULFUR DYE AND PROCESS OF MAKING SAME.

960,652.  Specification of Letters Patent.  Patented June 7, 1910.

No Drawing. Application filed February 12, 1910. Serial No. 543,455.

*To all whom it may concern:*

Be it known that I, GEORG LIST, doctor of philosophy, chemist, a subject of the German Emperor, and resident of Offenbach-on-the-Main, in the Grand Duchy of Hessen, with post-office address Obermainstrasse No. 79, have invented new and useful Improvements in Brown Sulfur Dyes and Processes of Making Same, of which the following is a specification.

I have found that new valuable dyestuffs result by heating the diphenylmethan derivative, obtained by condensation of orthonitrophenol with formaldehyde (see German Letters Patent No. 72490), with alkalipolysulfids at temperatures exceeding 100° C. An addition of copper or its salts to the mass being in reaction will be of great advantage. The thus obtained new sulfur dyestuffs dye unmordanted cotton from reddish-brown to violet-brown shades of very good fastness to light and milling.

The following examples will serve to further illustrate the nature of my invention and how it can be carried into practical effect. The parts are weight.

Example I: To a solution of alkalipolysulfid prepared from 180 parts of crystallized sodium sulfid 75 parts of sulfur and 50 parts of water are added while stirring 15 parts of copper sulfate and 45 parts of dinitrodioxydiphenylmethan obtained by condensing ortho-nitrophenol with formaldehyde. As soon as the reaction, being very energetic in the beginning of the operation, slows down the mass is heated up to 100°–110° C. and kept at this temperature for several hours until the formation of dyestuff is completed. The raw pasty mass is dried and ground. To produce the free color acid the pasty raw mass is dissolved in water and the color acid precipitated by passing a current of air through the solution. The thus obtained dyestuff dissolves in dilute alkalipolysulfids with violet color, in concentrated sulfuric acid with brown color and dyes unmordanted cotton clear reddish-brown shades with a violet bloom.

Example II: 45 parts of the dinitrodioxydiphenylmethan, described in Example I, are added while stirring to a boiling solution of 180 parts of crystallized sodium sulfid 75 parts of sulfur and 50 parts of water. As soon as the reaction, being very energetic in the beginning of the operation, slows down the mass is gradually heated up to 150°–180° C. and finally to 190°–210° for several hours until the color of a test portion does not increase any more. The mass is dried and ground. The thus obtained dyestuff dissolves in water, an addition of sodium sulfid not being required. It is soluble in dilute alkalipolysulfids with violet color, in concentrated sulfuric acid with brown color and dyes unmordanted cotton reddish-brown shades, somewhat more yellowish ones as the dyestuff, described in Example I, does.

Now what I claim and desire to secure by Letters Patent is the following:

1. The process of making brown sulfur dyestuffs by heating the diphenylmethan derivative, obtained by condensation of orthonitrophenol with formaldehyde, with alkalipolysulfids at temperatures exceeding 100° C.

2. As a new article of manufacture the brown sulfur dyestuffs which can be obtained by heating the diphenylmethan derivative, obtainable by condensation of ortho-nitrophenol with formaldehyde, with alkalipolysulfids at temperatures exceeding 100° C., which dyestuffs dye unmordanted cotton from reddish- to violet-brown shades, and dissolve in dilute alkalisulfids with violet color, in concentrated sulfuric acid with brown color.

In testimony, that I claim the foregoing as my invention, I have signed my name in presence of two witnesses, this 31st day of January 1910.

GEORG LIST.

Witnesses:
JEAN GRUND,
CARL GRUND.